United States Patent Office.

WILLIAM VAN WYCK, OF BELLEVILLE, NEW JERSEY.

Letters Patent No. 61,898, dated February 5, 1867.

IMPROVED METHOD OF REFINING AND BLEACHING SUGAR, SIRUP, &c.

*The Schedule referred to in these Letters Patent and making part of the same.*

TO WHOM IT MAY CONCERN:

Be it known that I, WILLIAM VAN WYCK, of the town of Belleville, county of Essex, State of New Jersey, have invented a new and useful Method for Refining and Bleaching Sugars, Sirups, and Molasses; and I do hereby declare that the following is a full, clear, and exact description of the same.

The nature of my invention consists in a new and improved method for refining and bleaching sugar, sirup, and molasses.

My process is as follows: I prepare a vessel of suitable material, as tin, iron, clay, &c., and of a form proper for a filter. This vessel is to be erected so as to be capable of being heated, and kept hot during the operation, to a temperature of about 212° Fahrenheit—and I find a steam jacket to answer this purpose. The hot filter is now to be charged with bone-black, or equivalent discoloring materials; and I heat this material also, first, up to a temperature of 212° Fahrenheit—the steam heat being also applied to the vessel by means of the steam jacket. I then heat the sugar. sirup, or molasses also to a temperature of about 212° Fahrenheit, and keep it so during the operation. I then pour it in at the top of the filter, and keep the filter, its material for filtering, and the sugar, sirup, or molasses up to about 212° Fahrenheit during the operation.

First, the improvement consists in the fact that the sugar, sirup, and molasses, being kept hot during the operation, pass more freely through the filtering materials, and being of a thinner consistency, are more easily and thoroughly acted on by the filtering material. Second, the refining power of the filtering material is greatly intensified and increased by the high heat. Third, by this process I am enabled to use exceedingly fine bone-black, whereas at present only grained bone-black is used for the purification of sugar, sirup, and molasses; and as this exceedingly pulverized bone-black is comparatively cheap, by using it my process is much cheaper, and a great saving in the refining of sugar, sirup, and molasses.

Claims.

1. I claim in this new method of mine the keeping at a high heat (say about 212° Fahrenheit) the filter, the filtering material in the filter, also the sugar, sirup, and molasses, during the entire operation of filtration.

2. I claim the application of the steam jacket, or its equivalent, in the refining of sugars, sirup, and molasses, for the purpose of keeping to a high heat (say about 212° Fahrenheit) the filtering vessel, the filtering material, and the sirup, sugar, and molasses to be filtered.

In witness whereof I have hereunto set my hand.

WILLIAM VAN WYCK.

Witnesses:
 CORNS. J. VAN WYCK,
 JOSEPH MAGOFFIN.